L. A. HANSON & G. W. HALL.
HEATING SYSTEM FOR AUTOMOBILE STEERING GEAR WHEELS.
APPLICATION FILED DEC. 3, 1914.
1,145,308.
Patented July 6, 1915.
2 SHEETS—SHEET 1.
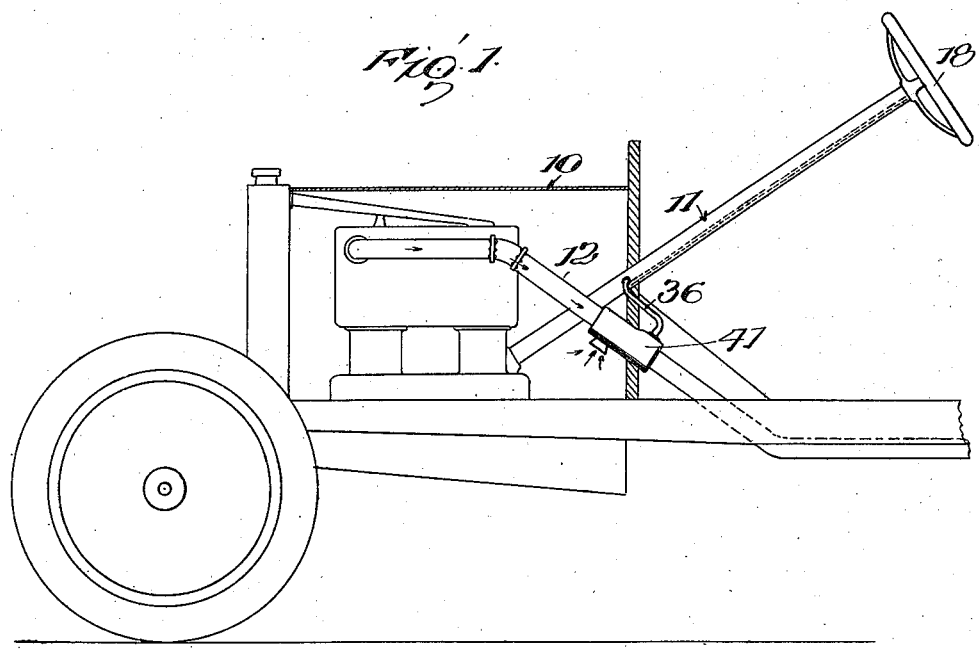
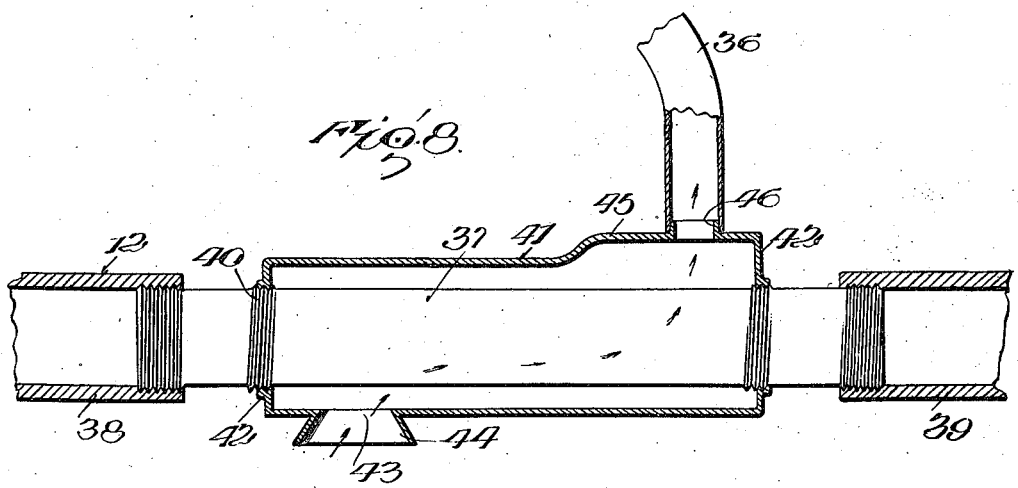
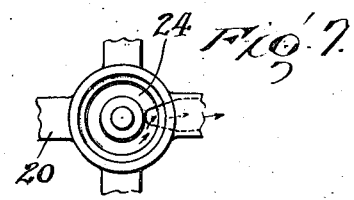
Inventor
G. W. Hall
L. A. Hanson

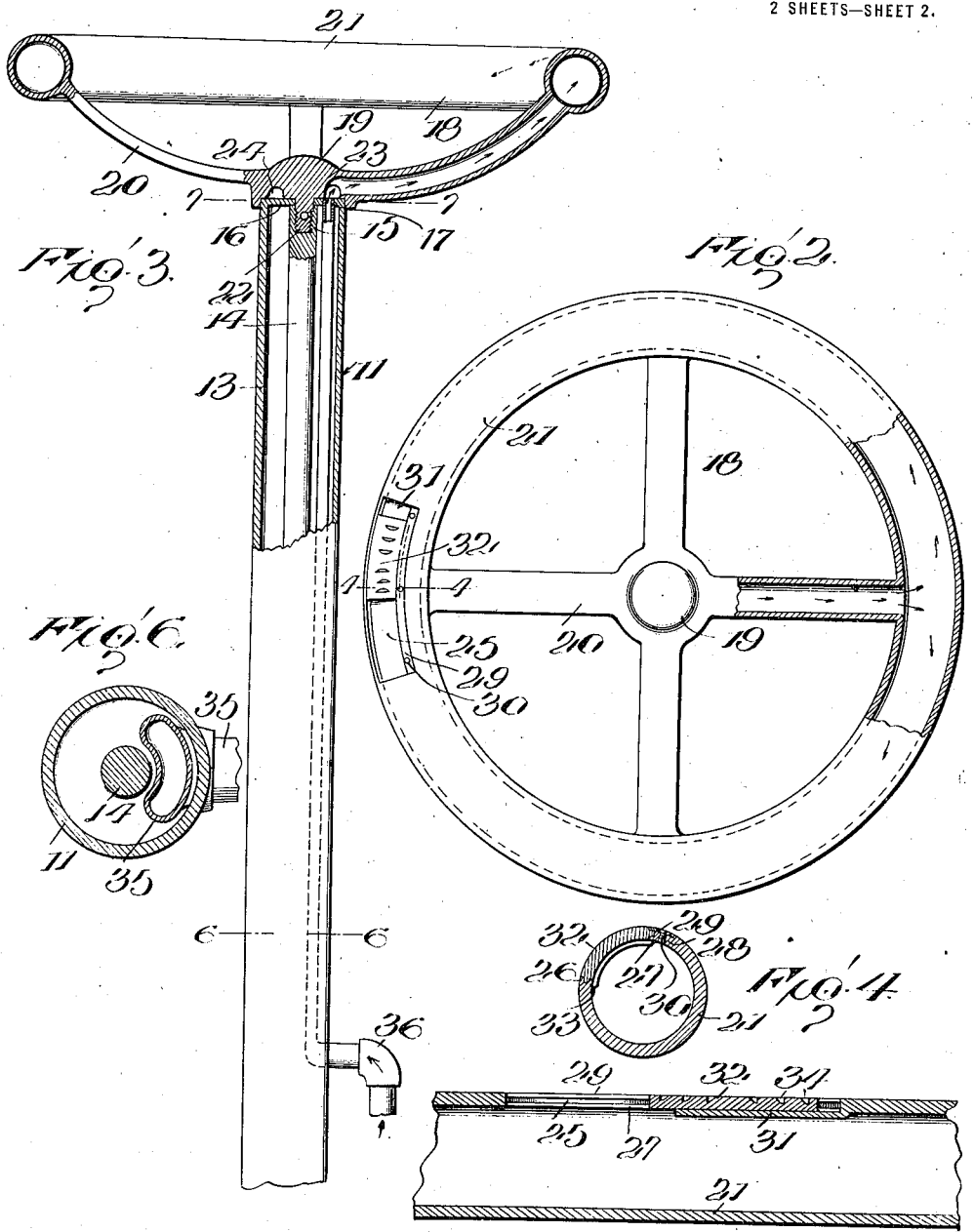

UNITED STATES PATENT OFFICE.

LENNIE A. HANSON AND GEORGE W. HALL, OF DEERING, NORTH DAKOTA.

HEATING SYSTEM FOR AUTOMOBILE STEERING-GEAR WHEELS.

1,145,308.   Specification of Letters Patent.   Patented July 6, 1915.

Application filed December 3, 1914.   Serial No. 875,347.

*To all whom it may concern:*

Be it known that we, LENNIE A. HANSON and GEORGE W. HALL, citizens of the United States, residing at Deering, in the county of McHenry and State of North Dakota, have invented certain new and useful Improvements in Heating Systems for Automobile Steering-Gear Wheels, of which the following is a specification.

Our invention relates to new and useful improvements in steering mechanisms for self-propelled vehicles, the primary object of our invention being the provision of means for heating the steering wheel. In this connection we employ a heating jacket which surrounds a portion of the exhaust manifold of the engine and a pipe or tube leading from this jacket through the steering column to a steering wheel of hollow construction having an outlet opening in order that the air from the heating jacket may rise through the pipe and pass through the steering wheel.

A further object of our invention consists in the provision of means for regulating the size of the vent or outlet opening in the steering wheel in order to regulate the amount of heated air which will pass through the wheel and, consequently, to control the extent to which the wheel shall be heated.

A still further object of our invention is to construct the steering wheel in such a manner that but one of its spokes need be of hollow formation to insure proper heating of the wheel, irrespective of how the wheel is turned.

With these and other objects in view, my invention will be more fully described, illustrated in the accompanying drawings, and then specifically pointed out in the claims which are attached to and form a part of this application.

In the drawings: Figure 1 is a fragmentary sectional view of a conventional form of motor vehicle, showing our invention in use; Fig. 2 is a top plan view of the steering wheel, parts being shown in section to illustrate certain details of construction; Fig. 3 is a fragmentary side elevational view of the steering column, the steering wheel and a portion of the steering column being shown in central, vertical section; Fig. 4 is a detail sectional view taken on the line 4—4 of Fig. 2, illustrating the manner of mounting the slide which controls the passage of heated air through the steering wheel; Fig. 5 is a sectional view taken at right angles to the view shown in Fig. 4, further illustrating the manner of mounting this slide; Fig. 6 is a transverse sectional view taken through the steering column on the line 6—6 of Fig. 3, illustrating the manner in which the hot air pipe is led through the column; Fig. 7 is a section on the line 7—7 of Fig. 3, looking in the direction of the arrows and illustrating certain details of steering wheel construction; Fig. 8 is a central longitudinal sectional view taken through the heating jacket, showing its manner of application to the exhaust pipe.

Corresponding and like parts are referred to in the following description and indicated in all the views of the drawings by the same reference characters.

In order to insure a clear and accurate understanding of our invention, we have illustrated it in connection with a conventional form of motor vehicle 10 having a steering column 11 and exhaust pipe 12. Referring more particularly to Fig. 3 of the drawings, it will be seen that the steering column includes a fixed tubular housing 13 inclosing the steering post proper 14 which is of considerably less diameter than the housing and the upper end of which is provided with an internally threaded socket 15. The upper end of the housing is provided with an inwardly directed annular flange 16 which engages about the upper end of the steering post 14 forming a substantially air tight chamber. This flange, however, at one point, is provided with a port or opening 17, as best shown in Fig. 7.

The steering wheel, indicated as a whole by the numeral 18, includes a hub portion 19, radial spokes 20 and a rim or body portion 21. The hub portion has its lower face cut-away to seat snugly about the upper end of the housing 13 of the steering column and is provided centrally with a threaded stud 22 for engagement in the threaded socket of the steering post, a pin 23 or other suitable means being utilized to additionally lock the steering wheel to the steering post if deemed advisable. The lower face of the steering wheel hub is further cut-away or channeled to provide a concentric annular chamber 24 which, in any position of the steering wheel, will communicate with the port 17. One of the spokes 20 of the steering wheel is of tubular construction, as best shown in Figs.

2 and 3 of the drawings and the rim or body portion of the wheel is also made in the form of a continuous tube with which this spoke communicates. Furthermore, the rim or body portion of the wheel, at a point diametrically opposite the outer end of the tubular spoke, is provided with an outlet opening 25 in the form of a rectangular slot.

In forming this slot, one of its longitudinal edges is channeled to provide a groove 26, while the other edge is cut-away to provide inner and outer stepped shoulders 27 and 28, the inner shoulder 27 corresponding to the inner face of the groove 26. A strip of metal 29 is secured against the shoulder 28 by means of a plurality of screws 30 or other suitable fastening devices with its free edge projecting in spaced relation to the inner shoulder 27 and in effect corresponding to the upper face or shoulder of the channel 26. A portion of the rim or body 21 of the steering wheel, at one end of the slot, is instruck or depressed as shown at 31 and the edge portions of the seat defined by this construction are provided with channels forming continuations of those above described. A sliding plate 32, arcuate in cross section to correspond to the curvature of the wheel rim, is provided at either side with longitudinal ribs or shoulders 33 adapted to slide in the channel 26 and in the channel formed between the shoulder 27 and free edge of the plate 29. This slide or plate is of a length sufficient to completely close the opening 25 when in one position, while the instruck portion of the guideway for the plate is of sufficient length to permit movement of the plate to fully withdraw it from the opening 25. The outer face of the plate is notched transversely as shown at 34 in order that it may be conveniently moved from one position to the other. It will, of course, be clear that by proper manipulation of this sliding plate or closure, an outlet opening of any desired extent may be provided.

An air tube or pipe 35 communicates at one end with the port 17 of the housing flange 16 and extends longitudinally of the housing to any suitable point adjacent the exhaust pipe 12, at which point it is extended through the housing and connected with a pipe 36. That portion of the pipe 35 located within the housing is preferably flattened and curved as shown in Fig. 6 to permit the employment of a larger tube than would be possible if the tube was circular in cross section.

From the foregoing description, it will be clear that means is provided for supplying hot air to the pipe 36, this air, because of its heat, passing upwardly through the tube 35 and port 17 into the annular chamber 24 of the steering wheel. From this chamber, it will pass through the tubular spoke of the steering wheel and into the tubular rim or body thereof, divide when it reaches the rim, and pass in both directions about the rim and out through the opening 25. It will further be clear that the rate of passage of hot air through the wheel may be readily controlled by the extent to which the sliding closure 32 is opened, no air passing through the wheel when this closure is shut.

As a means for supplying heated air to the pipe 36, we have provided a heater, the construction of which is best shown in Fig. 8 of the drawings. This heater includes a pipe section 37 having externally threaded terminals for connection between the pipe sections 38 and 39 of the exhaust pipe 12 and also provided adjacent these threaded terminals with externally threaded portions 40. The heater proper includes a casing 41 substantially circular in cross section and provided at its ends with inwardly directed annular flanges 42 which are threaded for engagement with the threaded portions 40 of the pipe 37. This body member, adjacent one end, is provided in its lower face with an inlet opening 43 surrounded by an outwardly flaring annular flange 44 serving to direct the inlet of air to the casing. At its opposite end, the upper portion of the casing is extended somewhat as shown at 45 and provided with an outlet port 46 with which the pipe 36 communicates.

In operation, assuming that the engine is running as usual, air will pass in through the port 43 and about the heated pipe section 37, thereby becoming highly heated and, as a result, passing through the pipe 36 to the steering wheel, as previously described.

This construction, while it constitutes the preferred embodiment of our invention, is capable of numerous modifications in details and for this reason we do not wish to limit ourselves in any way to the specific features shown, our invention being set forth in the claims.

Having thus described the invention, what is claimed as new is:

1. In a system for heating steering wheels of motor vehicles, the combination with a tubular steering column and a steering post mounted in the column, the upper end of the column having a flange engaging about the post and provided with an outlet port, of a steering wheel having a hub portion operatively connected to the steering post, said hub portion being formed with an annular chamber communicating with the outlet port of the steering column, a tubular rim for the steering wheel having an outlet opening, a tubular spoke communicating between the annular chamber of the hub and the rim, the point of communication being diametrically opposite the outlet port of the rim, and an air tube leading through the steering column to the outlet port thereof.

2. In a system for heating steering wheels of motor vehicles, the combination with a tubular steering column and a steering post mounted in the column, the upper end of the column having a flange engaging about the post and provided with an outlet port, of a steering wheel having a hub portion operatively connected to the steering post, said hub portion being formed with an annular chamber communicating with the outlet port of the steering column flange, a tubular rim for the steering wheel having an outlet opening, a tubular spoke communicating between the annular chamber of the hub and the rim, the point of communication being diametrically opposite the outlet port of the rim, and an air tube leading through the steering column to the outlet port thereof, said air tube within the steering column being flattened and curved, whereby it may transmit considerable air and still be positioned between the column and post.

3. A system for heating steering wheels of motor vehicles including a steering wheel having a tubular rim, means for supplying heated air to the rim, said rim being provided at one side with a substantially rectangular shaped opening for the outlet of air supplied, longitudinal guide grooves provided at the sides of the opening, said guide grooves extending beyond the opening at one end, and a slidable plate mounted in the guide grooves and movable to close the opening to any desired extent, the outer face of the plate lying flush with the outer face of the rim.

In testimony whereof we affix our signatures in presence of two witnesses.

LENNIE A. HANSON. [L. S.]
GEORGE W. HALL. [L. S.]

Witnesses:
F. ROBLE,
AMANDA ROBLE.